(12) United States Patent
Inada

(10) Patent No.: US 11,259,100 B2
(45) Date of Patent: Feb. 22, 2022

(54) VARIABLE EQUALIZER AND METHOD FOR CONTROLLING VARIABLE EQUALIZER

(71) Applicant: NEC CORPORATION, Tokyo (JP)

(72) Inventor: Koji Inada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/964,656

(22) PCT Filed: Mar. 12, 2019

(86) PCT No.: PCT/JP2019/009846
§ 371 (c)(1),
(2) Date: Jul. 24, 2020

(87) PCT Pub. No.: WO2019/176894
PCT Pub. Date: Sep. 19, 2019

(65) Prior Publication Data
US 2021/0058684 A1    Feb. 25, 2021

(30) Foreign Application Priority Data

Mar. 16, 2018  (JP) .............................. JP2018-048868

(51) Int. Cl.
*H04Q 11/00* (2006.01)
*H04J 14/02* (2006.01)
*H04L 25/03* (2006.01)

(52) U.S. Cl.
CPC .......... *H04Q 11/0005* (2013.01); *H04J 14/02* (2013.01); *H04L 25/03006* (2013.01);
(Continued)

(58) Field of Classification Search
CPC ....... H04Q 11/0005; H04Q 2011/0015; H04Q 2011/16; H04Q 2011/35; H04Q 2011/41;
(Continued)

(56) References Cited

U.S. PATENT DOCUMENTS 6,034,812 A    3/2000  Naito
6,219,176 B1 *  4/2001  Terahara ............. H01S 3/10023
359/341.1
(Continued)

FOREIGN PATENT DOCUMENTS

EP    0794599 A2    9/1997
JP    09-244079 A   9/1997
(Continued)

OTHER PUBLICATIONS

International Search Report for PCT/JP2019/009846 dated May 28, 2019 [PCT/ISA/210].
(Continued)

*Primary Examiner* — Nathan M Cors
(74) *Attorney, Agent, or Firm* — Sughrue Mion, PLLC

(57) ABSTRACT

In order to realize a variable equalizer which is compact and has a wide range of tilt level adjustment, this variable equalizer is provided with a first optical equalizer group including a plurality of first equalizers having mutually different tilt amounts, a second optical equalizer group including a plurality of second equalizers, and an optical element for forming the optical path of an optical signal so that an inputted optical signal is outputted passing through a selected first optical equalizer and a selected second optical equalizer, at least one of the plurality of second optical equalizers having a tilt amount different from any of the plurality of first optical equalizers.

6 Claims, 10 Drawing Sheets

(52) U.S. Cl.
CPC ............ *H04Q 2011/0015* (2013.01); *H04Q 2011/0016* (2013.01); *H04Q 2011/0035* (2013.01); *H04Q 2011/0041* (2013.01); *H04Q 2011/0058* (2013.01)

(58) Field of Classification Search
CPC ............ H04Q 2011/58; H04J 14/0221; H04J 14/0227
See application file for complete search history.

(56) References Cited

U.S. PATENT DOCUMENTS

| | | | |
|---|---|---|---|
| 2002/0079435 A1 | 6/2002 | Kuroshima | |
| 2002/0149840 A1* | 10/2002 | So | H01S 3/13013 359/337.1 |
| 2004/0126120 A1* | 7/2004 | Cohen | G02F 1/0115 398/158 |
| 2006/0072188 A1 | 4/2006 | Al-Salameh et al. | |
| 2008/0056726 A1* | 3/2008 | Sugiya | H04B 10/25133 398/147 |
| 2014/0334814 A1* | 11/2014 | Ji | H04B 10/07955 398/26 |

FOREIGN PATENT DOCUMENTS

| | | |
|---|---|---|
| JP | 11-87812 A | 3/1999 |
| JP | 11-224967 A | 8/1999 |
| JP | 2000-209151 A | 7/2000 |
| JP | 2001-237776 A | 8/2001 |
| JP | 2002-198911 A | 7/2002 |
| JP | 2008-154123 A | 7/2008 |
| WO | 2017/022231 A1 | 2/2017 |

OTHER PUBLICATIONS

Written Opinion for PCT/JP2019/009846 dated May 28, 2019 [PCT/ISA/237].

Extended European Search Report for EP Application No. EP19766500.3 dated Apr. 20, 2021.

* cited by examiner

Fig.2

| COMBINATION OF TILT EQUALIZERS | | POST-STAGE EQUALIZER | | |
|---|---|---|---|---|
| | | −3dB | 0dB | +3dB |
| PRE-STAGE EQUALIZER | −1dB | −4dB | −1dB | +2dB |
| | 0dB | −3dB | 0dB | +3dB |
| | +1dB | −2dB | +1dB | +4dB |

Fig.6

| COMBINATION OF TILT EQUALIZERS | | INTERMEDIATE-STAGE EQUALIZER | | |
|---|---|---|---|---|
| | PRE-STAGE EQUALIZER | | | |
| −0.5dB | | −1.5dB | 0dB | +1.5dB |
| 0dB | | −2dB | −0.5dB | +1dB |
| | | −1.5dB | 0dB | +1.5dB |
| +0.5dB | | −1dB | +0.5dB | +2dB |

Fig.7

| COMBINATION OF TILT EQUALIZERS | | POST-STAGE EQUALIZER | | |
|---|---|---|---|---|
| | | −4.5dB | 0dB | +4.5dB |
| PRE-STAGE EQUALIZER + INTERMEDIATE-STAGE EQUALIZER | −2dB | −6.5dB | −2dB | +2.5dB |
| | −1.5dB | −6dB | −1.5dB | +3dB |
| | −1dB | −5.5dB | −1dB | +3.5dB |
| | −0.5dB | −5dB | −0.5dB | +4dB |
| | 0dB | −4.5dB | 0dB | +4.5dB |
| | +0.5dB | −4dB | +0.5dB | +5dB |
| | +1dB | −3.5dB | +1dB | +5.5dB |
| | +1.5dB | −3dB | +1.5dB | +6dB |
| | +2dB | −2.5dB | +2dB | +6.5dB |

_US 11,259,100 B2_

VARIABLE EQUALIZER AND METHOD FOR CONTROLLING VARIABLE EQUALIZER

CROSS REFERENCE TO RELATED APPLICATIONS

This application is a National Stage of International Application No. PCT/JP2019/009846 filed Mar. 12, 2019, claiming priority based on Japanese Patent Application No. 2018-048868 filed Mar. 16, 2018, the disclosure of which is incorporated herein in its entirety by reference.

TECHNICAL FIELD

The present invention relates to a variable equalizer and a control method for a variable equalizer, and particularly relates to a variable tilt equalizer in which a tilt of a wavelength characteristic of the equalizer is variable, and a control method therefor.

BACKGROUND ART

In order to ensure transmission quality of a long-distance optical submarine cable system, a tilt of a wavelength characteristic (optical profile) of an intensity of an optical signal propagating through an optical transmission path is desirably flat (tilt level is 0 dB) in a period from a BOL to an EOL of the system. The BOL represents a beginning of life, and the EOL represents an end of life. However, a tilt level of the optical profile fluctuates due to repair or aged deterioration of a submarine cable and a repeater. Accordingly, a variable tilt equalizer device capable of adjusting a tilt level is necessary for keeping a tilt level flat during system operation.

In connection with the present invention, PTL 1 discloses a technique for adjusting an optical gain profile in an optical amplification repeater transmission system. PTL 2 discloses a technique for compensating a dispersion slope in an optical transmission system.

CITATION LIST

Patent Literature

[PTL 1] Japanese Unexamined Patent Application Publication No. 2001-237776
[PTL 2] Japanese Unexamined Patent Application Publication No. 2008-154123

SUMMARY OF INVENTION

Technical Problem

FIG. 8 is a diagram illustrating a configuration of a general variable equalizer 900. The variable equalizer 900 includes two 1×9 optical switches and nine tilt equalizers. The two 1×9 optical switches select one tilt equalizer, and give a loss based on a predetermined wavelength characteristic to an input wavelength division multiplexing (WDM) optical signal. The tilt equalizer gives a loss varying depending on a wavelength to an optical signal, and thereby, a tilt level of the optical signal is adjusted. WDM is an abbreviation for wavelength division multiplexing, and a wavelength division multiplexing optical signal is referred to as "WDM signal" hereinafter.

FIGS. 9 to 11 are diagrams illustrating a wavelength characteristic of a tilt equalizer. The tilt equalizer is a device in which a loss changes monotonically with respect to a wavelength in a predetermined wavelength range from $\lambda 1$ to $\lambda 2$ ($\lambda 1 < \lambda 2$). As a commercially available tilt equalizer, one fabricated with a fiber grating is known. FIG. 9 illustrates an example of a wavelength characteristic of a tilt equalizer of +n dB. A loss at the wavelength $\lambda 2$ in the tilt equalizer of +n dB is higher by n (dB) than a loss at the wavelength $\lambda 1$. For example, assuming that a loss at the wavelength $\lambda 1$ in the tilt equalizer is 0.5 dB, a loss at the wavelength $\lambda 2$ in the tilt equalizer of +n dB is n+0.5 dB. FIG. 10 illustrates an example of a wavelength characteristic of a tilt equalizer of −n dB. A loss at the wavelength $\lambda 1$ in the tilt equalizer of −n dB is higher by n (dB) than a loss at the wavelength $\lambda 2$. FIG. 11 illustrates an example of a wavelength characteristic of a tilt equalizer of 0 dB. In the tilt equalizer of 0 dB, a loss in a range from the wavelength $\lambda 1$ to the wavelength $\lambda 2$ is constant (e.g., 0.5 dB). In FIGS. 9 to 11, change in loss in a range from the wavelength $\lambda 1$ to the wavelength $\lambda 2$ is monotonic.

The variable equalizer 900 has a problem that a large number of the tilt equalizers are necessary for expanding an adjustment range of a tilt level. For example, in the variable equalizer 900, nine tilt equalizers are necessary for setting tilt levels at an interval of 1 dB in a range from −4 dB to +4 dB. Since a communication device to be installed on the seabed is required to be smaller in size, there is limitation on the number of devices that can be mounted in the communication device. Thus, in a multi-core system in which many signal lines are used, a large number of tilt equalizers are necessary, thereby a system price is caused to rise.

Object of Invention

An object of the present invention is to provide a technique for implementing a small-sized variable equalizer with a wide adjustment range of a tilt level, and a control method for the variable equalizer.

Solution to Problem

A variable equalizer according to the present invention includes: a first optical equalizer group including a plurality of first optical equalizers whose tilt amounts are different from each other; a second optical equalizer group including a plurality of second optical equalizers; and an optical element forming an optical path of an optical signal in such a way that the input optical signal passes through the selected first optical equalizer and the selected second optical equalizer and is output, wherein at least one of a plurality of the second optical equalizers has a tilt amount different from that of any of a plurality of the first optical equalizers.

A method of controlling a variable equalizer according to the present invention includes: selecting a first optical equalizer from a first optical equalizer group including a plurality of the first optical equalizers whose tilt amounts are different from each other; selecting a second optical equalizer from a second optical equalizer group including a plurality of the second optical equalizers in which at least one of a plurality of the second optical equalizers has a tilt amount different from that of any of a plurality of the first optical equalizers; and forming an optical path of an optical signal in such a way that the input optical signal passes through the first optical equalizer and the second optical equalizer and is output.

Advantageous Effects of Invention

The present invention provides a small-sized variable equalizer with a wide adjustment range of a tilt level.

BRIEF DESCRIPTION OF DRAWINGS

FIG. 2 is a table illustrating tilt amounts that can be implemented by the variable equalizer 100.

FIG. 6 is a diagram illustrating tilt amounts that can be set in a variable equalizer 200.

FIG. 7 is a diagram illustrating tilt amounts that can be set in the variable equalizer 200.

EXAMPLE EMBODIMENT

First Example Embodiment

Figure 1:
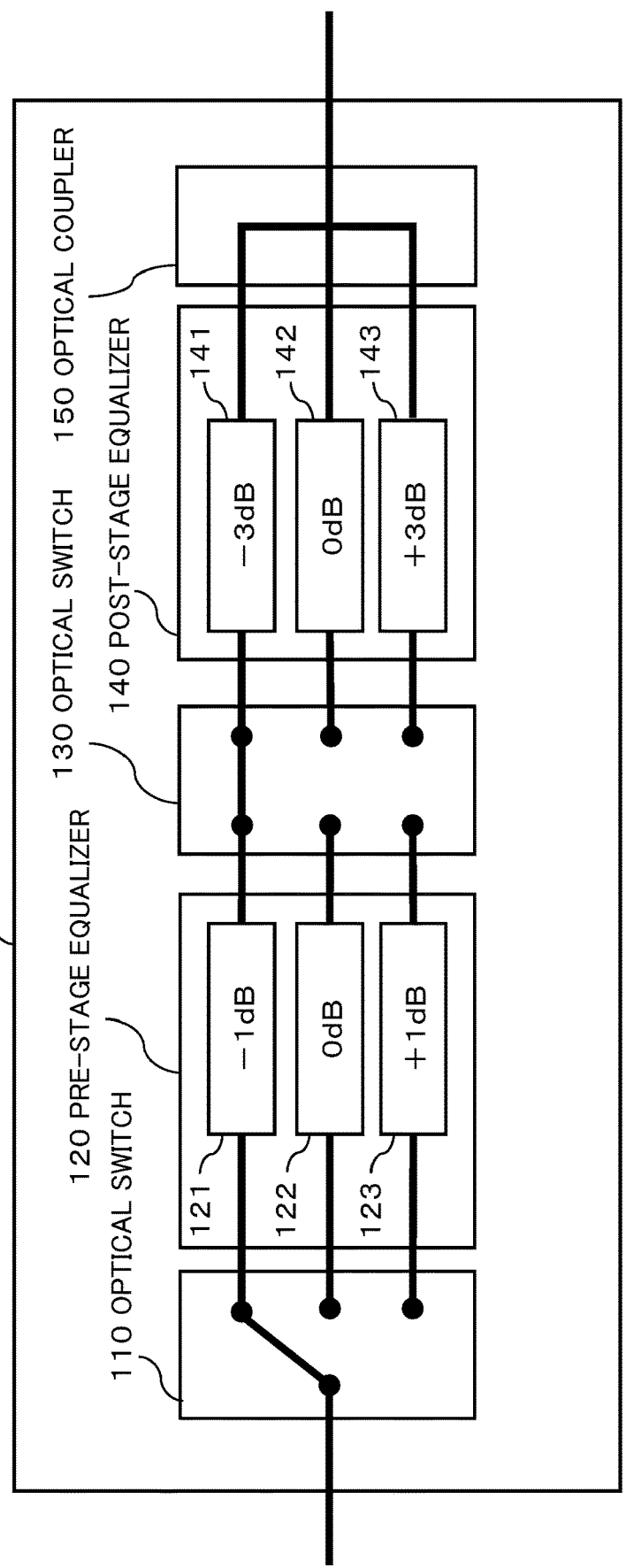
FIG. 1 is a diagram illustrating a configuration example of a variable equalizer 100 according to a first example embodiment.

FIG. 1 is a diagram illustrating a configuration example of a variable equalizer 100 according to a first example embodiment of the present invention. The variable equalizer 100 can vary a tilt level of an input optical signal in a range from −4 dB to +4 dB. The variable equalizer 100 includes an optical switch 110, a pre-stage equalizer 120, an optical switch 130, a post-stage equalizer 140, and an optical coupler 150.

The optical switch 110 is a 1×3 optical switch. The pre-stage equalizer 120 includes three tilt equalizers 121 to 123. Each of the three tilt equalizers 121 to 123 is an optical equalizer for adjusting a tilt level, and respective tilt amounts are −1 dB, 0 dB, and +1 dB. The optical switch 130 is a 3×3 optical matrix switch. The post-stage equalizer 140 includes three tilt equalizers 141 to 143. Each of the three tilt equalizers 141 to 143 is an optical equalizer for adjusting a tilt level, and respective tilt amounts are −3 dB, 0 dB, and +3 dB. The optical coupler 150 is a 3×1 optical coupler.

The optical switch 110 outputs an input optical signal to one of the tilt equalizers 121 to 123. The pre-stage equalizer 120 performs tilt level adjustment (one of −1 dB, 0 dB, and +1 dB) on the optical signal by a wavelength characteristic of the selected tilt equalizer. The optical signal on which the tilt level adjustment by a predetermined amount has been performed by the pre-stage equalizer 120 is output to the optical switch 130.

The optical switch 130 outputs, to one of the tilt equalizers 141 to 143, an optical signal output from the pre-stage equalizer 120. In other words, the optical switch 130 connects the tilt equalizer included in the pre-stage equalizer 120 and selected by the 1×3 optical switch 110, in series to the tilt equalizer included in the post-stage equalizer 140 and selected by the optical switch 130.

The post-stage equalizer 140 performs tilt level adjustment (one of −3 dB, 0 dB, or +3 dB) on an optical signal by a wavelength characteristic of the selected equalizer. The optical signal on which the tilt level adjustment by a predetermined amount has been performed by the post-stage equalizer 140 is output as an optical output signal via the optical coupler 150. Each of the pre-stage equalizer 120 and the post-stage equalizer 140 can be referred to as an equalizer group.

The optical coupler 150 outputs, to an outside of the variable equalizer 100, an optical signal output from the post-stage equalizer 140. Instead of the optical coupler 150, a 3×1 optical switch may be used. In this case, the 3×1 optical switch selects, from the tilt equalizers 141 to 143, the tilt equalizer from which an optical signal is output, and outputs the selected output to an outside of the variable equalizer 100.

The optical switch 110 and the optical switch 130 may be controlled from an outside of the variable equalizer 100. By controlling the optical switch 110 and the optical switch 130, a tilt level of an optical signal may be adjusted by the pre-stage equalizer 120 and the post-stage equalizer 140 in such a way as to approach a flat one. Such adjustment is also referred to as gain equalization. In this manner, the small-sized variable equalizer 100 with a wide adjustment range of a tilt level is implemented. The optical switches 110 and 130 and the optical coupler 150 can be referred to as an optical element that forms an optical path of an optical signal in such a way that the optical signal passes through the tilt equalizers selected from the pre-stage equalizer 120 and the post-stage equalizer 140.

FIG. 2 is a table illustrating tilt amounts that can be implemented by the variable equalizer 100. FIG. 2 illustrates that a combination of tilt amounts of the pre-stage equalizer 120 and the post-stage equalizer 140 enables a tilt amount of the variable equalizer 100 to be set in a range from −4 dB to +4 dB in a step of 1 dB. The optical switches 110 and 130 connect one of the tilt equalizers 121 to 123 and one of the tilt equalizers 141 to 143 in such a way that a desired tilt amount can be achieved.

Figure 8:
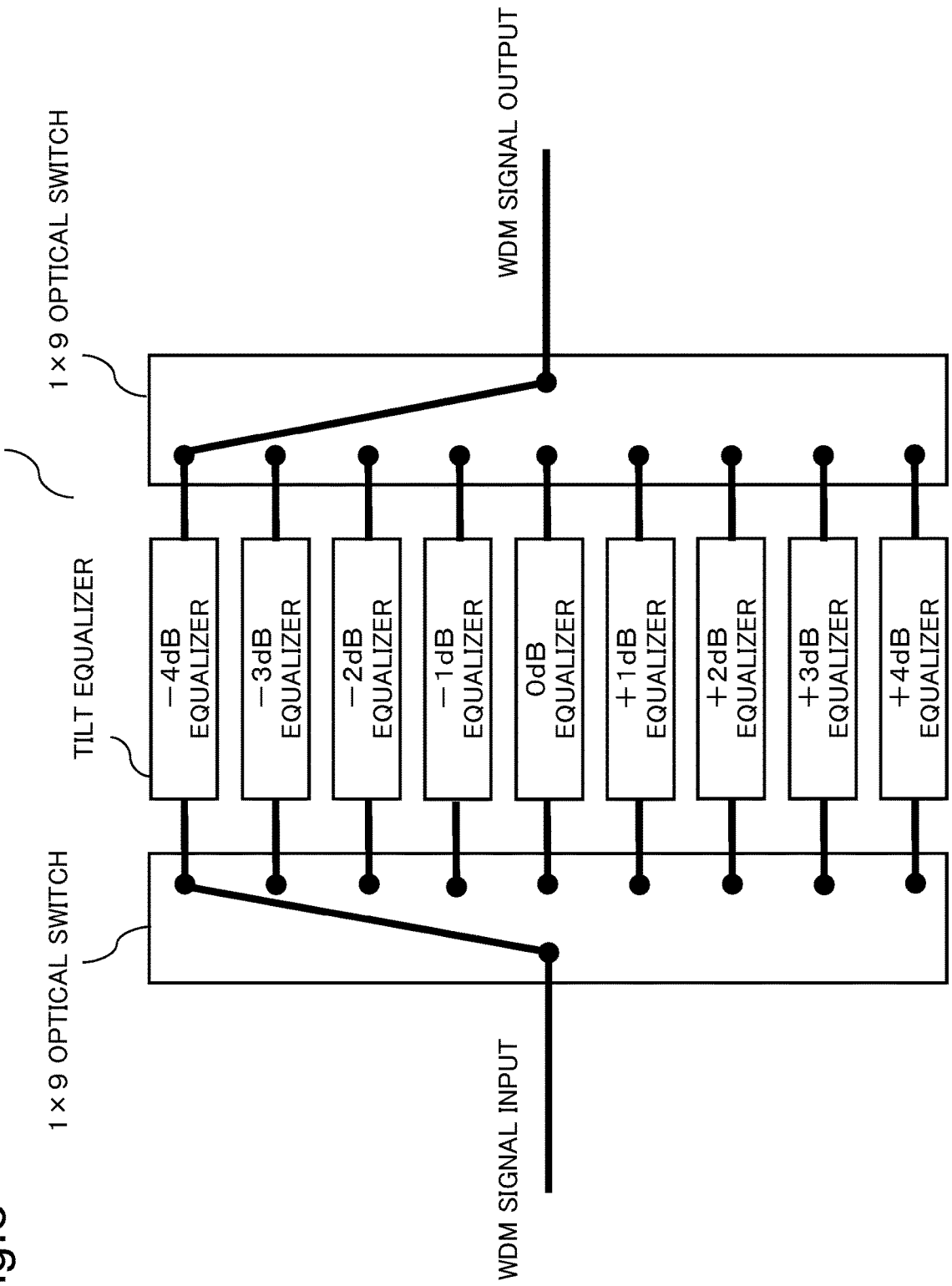
FIG. 8 is a diagram illustrating a configuration of a general variable equalizer 900.

As illustrated in FIG. 2, combining a plurality of tilt equalizers whose tilt levels are different from each other enables the variable equalizer 100 according to the present example embodiment to adjust a tilt level in a range from −4 dB to +4 dB. The total number of the optical devices included in the variable equalizer 100 is nine, and is smaller by two than that in the general variable equalizer 900 illustrated in FIG. 8.

Figure 9:
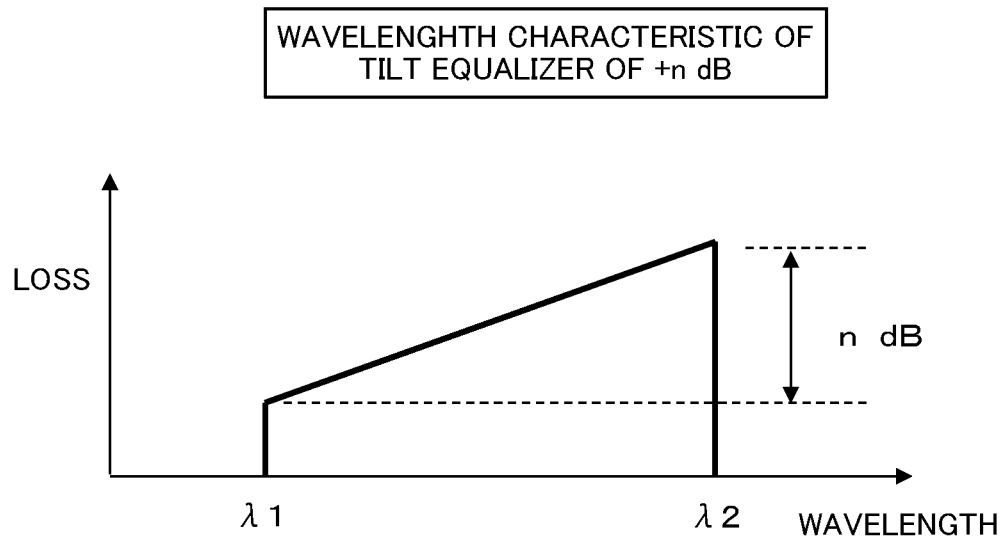
FIG. 9 is a diagram illustrating a wavelength characteristic of a tilt equalizer of +n dB.
Figure 10:
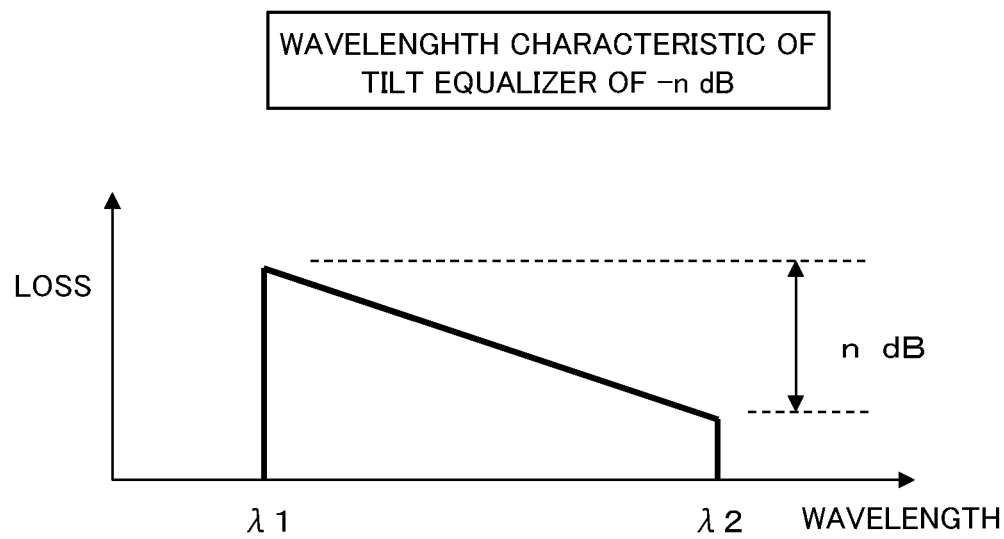
FIG. 10 is a diagram illustrating a wavelength characteristic of a tilt equalizer of −n dB.
Figure 11:
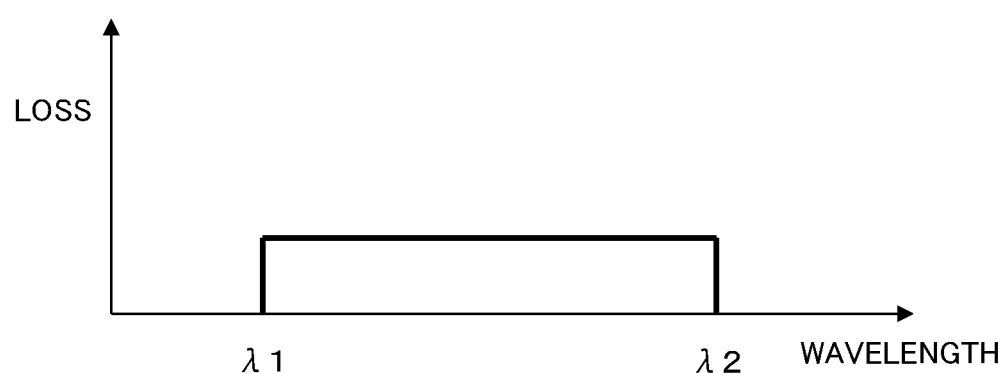
FIG. 11 is a diagram illustrating a wavelength characteristic of a tilt equalizer of 0 dB.

In the present example embodiment, the description is made on the case where the pre-stage equalizer 120 and the post-stage equalizer 140 each include the three tilt equalizers. However, the number of tilt equalizers need not be three. The number of tilt equalizers may be different between the pre-stage equalizer 120 and the post-stage equalizer 140. For example, the pre-stage equalizer 120 may include N tilt equalizers, and the post-stage equalizer 140 may include M tilt equalizers. In this case, the optical switch 110 may be a 1×N optical switch, the optical switch 130 may be an N×M optical matrix switch, and the optical coupler 150 may be an M×1 optical coupler. Herein, N and M are each an integer equal to or larger than two. An amount by which a tilt level is adjusted by the tilt equalizer is also not limited to a value in FIG. 2. A wavelength characteristic of each tilt equalizer may be any characteristic capable of adjusting a tilt level by desired amounts with a combination of the pre-stage equalizer 120 and the post-stage equalizer 140. A loss of the tilt equalizer in the vertical axis illustrated in each of FIGS. 9 and 10 may be a loss expressed with a linear scale, a logarithmic scale, or another scale in the present example embodiment.

The variable equalizer 100 enables the number of devices necessary for an equalizer device to be reduced by connecting, in series, the two tilt equalizers that are selected from a plurality of the tilt equalizers by using the optical switch 110 and the optical switch 130. Thus, the variable equalizer 100 provides a small-sized variable equalizer with a wide adjustment range of a tilt level, and can reduce cost of a device, such as an optical transmission device installed on the seabed, for which tight limitation is imposed on the number of mountable optical devices. Reducing the number of optical devices connected to one signal line enables a variable tilt equalizer device to easily treat a large number of signal lines (multi-core), and thus, easy expansion of a system also can be enabled.

Second Example Embodiment

Figure 3:
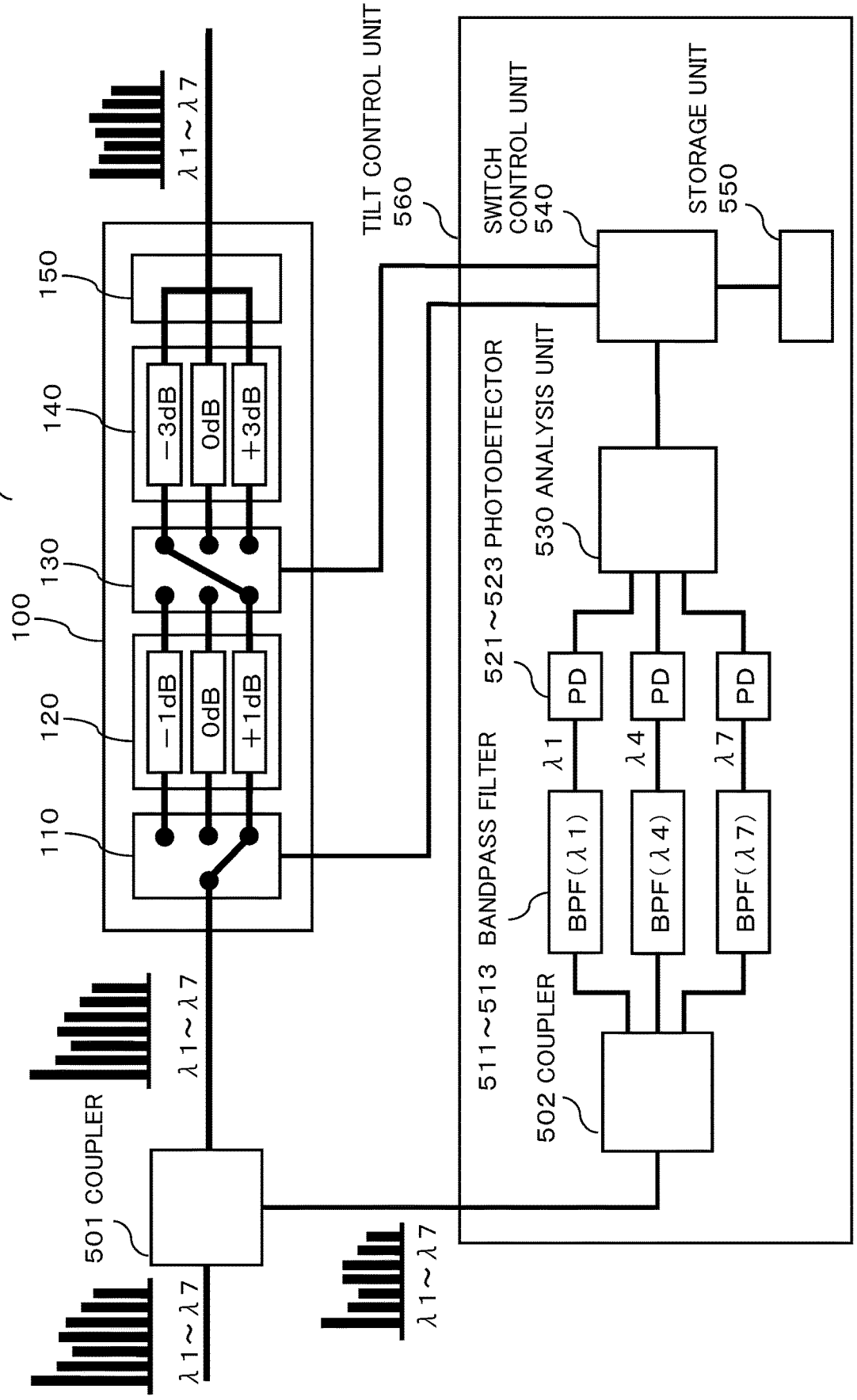
FIG. 3 is a diagram illustrating a configuration example of a variable equalizer system 500 according to a second example embodiment.

FIG. 3 is a diagram illustrating a configuration example of a variable equalizer system 500 according to a second example embodiment of the present invention. In the present example embodiment, a tilt level of the variable equalizer 100 is set based on a tilt level of an input optical signal. In the present example embodiment, an optical signal input to the variable equalizer 100 is a WDM signal including seven carriers whose wavelengths are λ1 to λ7 in ascending order. In the variable equalizer system 500, control of causing a tilt level of a WDM signal output from the variable equalizer 100 to approach a flat tilt level is performed.

The variable equalizer system 500 includes couplers 501 and 502, bandpass filters 511 to 513, photodetectors 521 to 523, an analysis unit 530, a switch control unit 540, and a storage unit 550 in addition to the variable equalizer 100 according to the first example embodiment. The coupler 502, the bandpass filters 511 to 513, the photodetectors 521 to 523, the analysis unit 530, the switch control unit 540, and the storage unit 550 are circuits controlling a tilt amount of the variable equalizer 100, and may be referred to as a tilt control unit 560. The tilt control unit 560 may include a coupler 501. The tilt control unit 560 serves as a tilt control means for controlling the optical switches 110 and 130 included in the variable equalizer 100, based on a tilt level of a WDM optical signal input to the switch 110.

The coupler 501 is a 1×2 optical coupler, and the coupler 502 is a 1×3 optical coupler. The coupler 501 splits, into two signals, a WDM signal input to the variable equalizer system 500, outputs the one signal to the variable equalizer 100, and outputs the other signal to the coupler 502. Power of the WDM signal split from the coupler 501 to the coupler 502 may be the minimum power for proper operation of the tilt control unit 560.

The coupler 502 splits, into three signals, a WDM signal input from the coupler 501, and outputs each of the signals to the bandpass filters 511 to 513. The bandpass filters 511 to 513 transmit only carriers having specific wavelengths included in the WDM signals, and output the carriers to the photodetectors 521 to 523. The bandpass filters 511, 512, and 513 are optical bandpass filters that transmit carriers having wavelengths λ1, λ4, and λ7, respectively. The wavelengths λ1 and λ7 are both ends (λ1 is the shortest wavelength, and λ7 is the longest wavelength) in a band of the WDM signal, and λ4 is an approximately middle wavelength in the band of the WDM signal. In the present example embodiment, based on intensities of the carriers having these three wavelengths, a tilt level is calculated. Instead of the coupler 502 and the bandpass filters 511 to 513, an optical demultiplexer or a wavelength selective switch (WSS) may be used. The optical demultiplexer and the WSS each extract carriers having wavelengths λ1, λ4, and λ7 from the WDM signal, and output the carriers to the photodetectors 521, 522, and 523.

The carriers having the wavelengths λ1, λ4, and λ7 are received by the photodetectors 521, 522, and 523, respectively. The photodetectors 521 to 523 are photodiodes for example, and generate electric signals proportional to intensities of the received carriers. The photodetectors 521 to 523 output the generated electric signals to the analysis unit 530.

Based on electric signals input from the photodetectors 521 to 523, the analysis unit 530 calculates intensities of carriers having wavelengths λ1, λ4, and λ7. The analysis unit 530 also analyzes, based on the calculated intensities, a tilt level of an optical signal input to the variable equalizer 100, and outputs the analysis result A to the switch control unit 540. For example, the analysis unit 530 may calculate, by regression analysis, a tilt of an intensity of a WDM signal with respect to a wavelength, from the intensities of a WDM signal at the wavelengths λ1, λ4, and λ7, whereby an intensity difference between λ1 and λ7 in the tilt may be used as the analysis result A. However, a procedure of calculating the analysis result A is not limited to this. The number of wavelengths to be extracted may be the number enabling a tilt level to be analyzed, and is not limited to three.

A target tilt level B used as a target of output of the variable equalizer 100 is stored in the storage unit 550, and the switch control unit 540 reads out the target tilt level B from the storage unit 550. The switch control unit 540 compares, with each other, the target tilt level B and an analysis result A of a tilt level input from the analysis unit 530, and calculates a tilt level adjustment amount C necessary for making a tilt level of an optical signal the target tilt level B. In other words, C is B-A. The target tilt level B needs not necessarily be 0 dB (flat). For example, in an optical transmission system in which optical repeaters are connected in series, the target tilt level B that is not flat may be set in order to allow each repeater to operate in a proper condition.

For example, it is assumed that when, in an analyzed tilt of a wavelength characteristic, an intensity at the wavelength λ1 is higher by 2 dB in intensity than an intensity at the wavelength λ7, an analysis result A is +2 dB, and a target tilt level B is 0 dB (flat). In this case, in the variable equalizer 100, in order to implement the target tilt level B, a setting is made in such a way that a decrease in intensity at the wavelength λ1 is smaller by 2 dB than in intensity at the wavelength λ7. In other words, a tilt level adjustment amount C is set as B−A=−2 dB. Referring to FIG. 2, a combination of the tilt equalizers that implements the tilt level adjustment amount C of −2 dB is the pre-stage equalizer (tilt equalizer 123) of +1 dB and the post-stage equalizer (tilt equalizer 141) of −3 dB.

The switch control unit 540 transmits, to each of optical switches, control signals for controlling the optical switch 110 and the optical switch 130 in such a way as to set a tilt level closest to a calculated tilt level adjustment amount C. As described in the first example embodiment, the optical switch 110 selects one of the tilt equalizers 121 to 123 included in the pre-stage equalizer 120. The optical switch 130 connects, to one of the tilt equalizers 141 to 143, one of the tilt equalizers 121 to 123 that is selected by the optical switch 110. In the above example, the optical switch 110 and the optical switch 130 are controlled in such a way that an optical signal passes through the tilt equalizer 123 and the tilt equalizer 141. In this manner, by connecting the tilt equalizers 121 to 123 and 141 to 143 selected based on control signals, a tilt level closest to a tilt level adjustment amount C is set in the variable equalizer 100.

Figure 4:
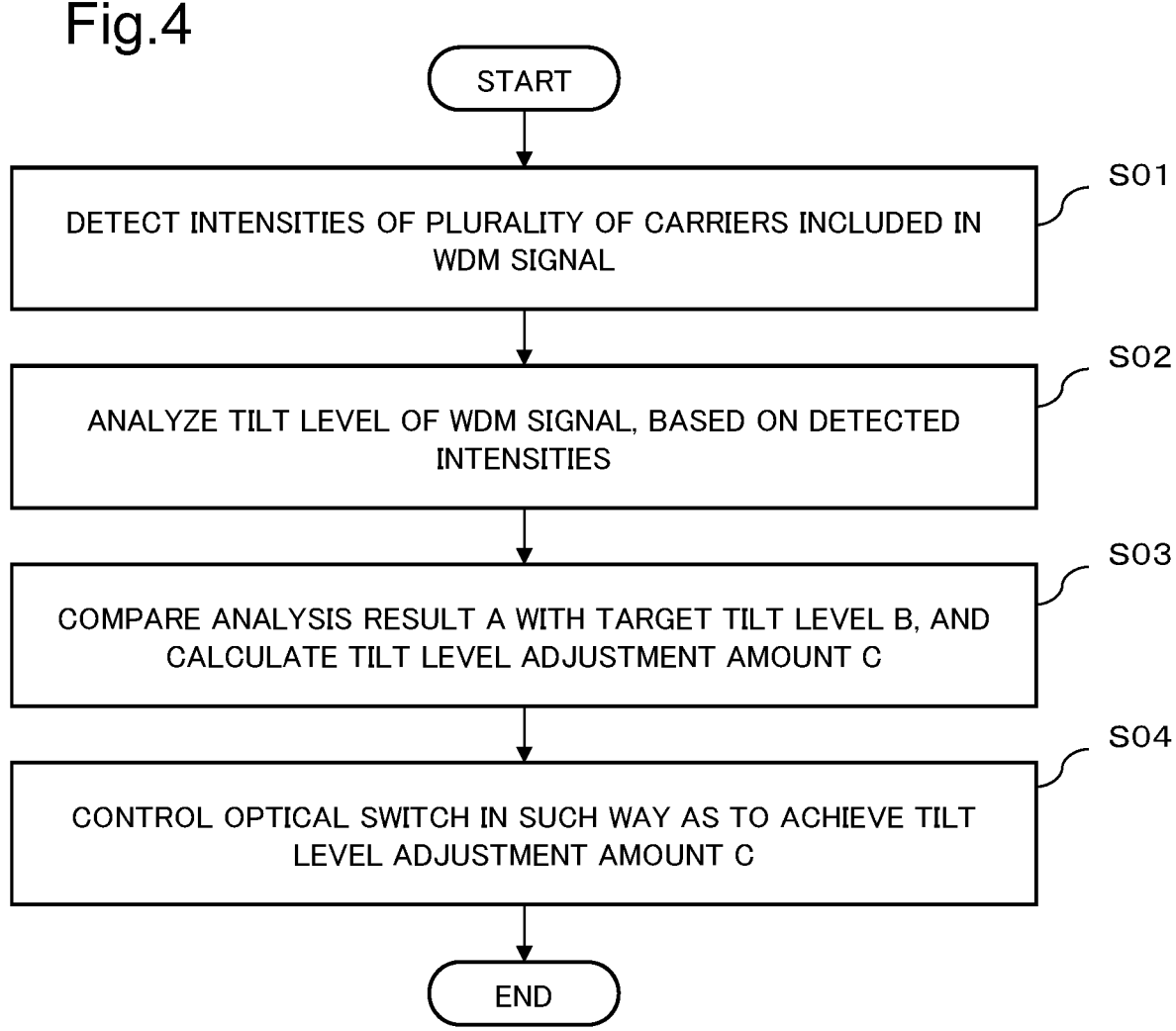
FIG. 4 is a flowchart illustrating an example of a control procedure of a tilt control unit 560.

FIG. 4 is a flowchart illustrating an example of a control procedure of the tilt control unit 560 in the present example embodiment. First, the photodetectors 521 to 523 detect intensities of a plurality of carriers included in a WDM signal (step S01 in FIG. 4). The analysis unit 530 analyzes a tilt level of the WDM signal, based on the detected intensities of the carriers, and calculates an analysis result A (step S02). The switch control unit 540 reads out a target tilt level B from the storage unit 550, compares the analysis result A with the target tilt level B, and calculates a tilt level adjustment amount C (step S03). The procedure of the step S03 may be performed by the analysis unit 530. The switch control unit 540 further controls the optical switches 110 and 130 in such a way as to implement the tilt level adjustment amount C (step S04).

Thus, the variable equalizer system 500 according to the present example embodiment achieves an advantageous effect of adjusting a tilt level of an input WDM signal by the tilt control unit 560, in addition to the advantageous effect of the variable equalizer 100 according to the first example embodiment.

Third Example Embodiment

Figure 5:
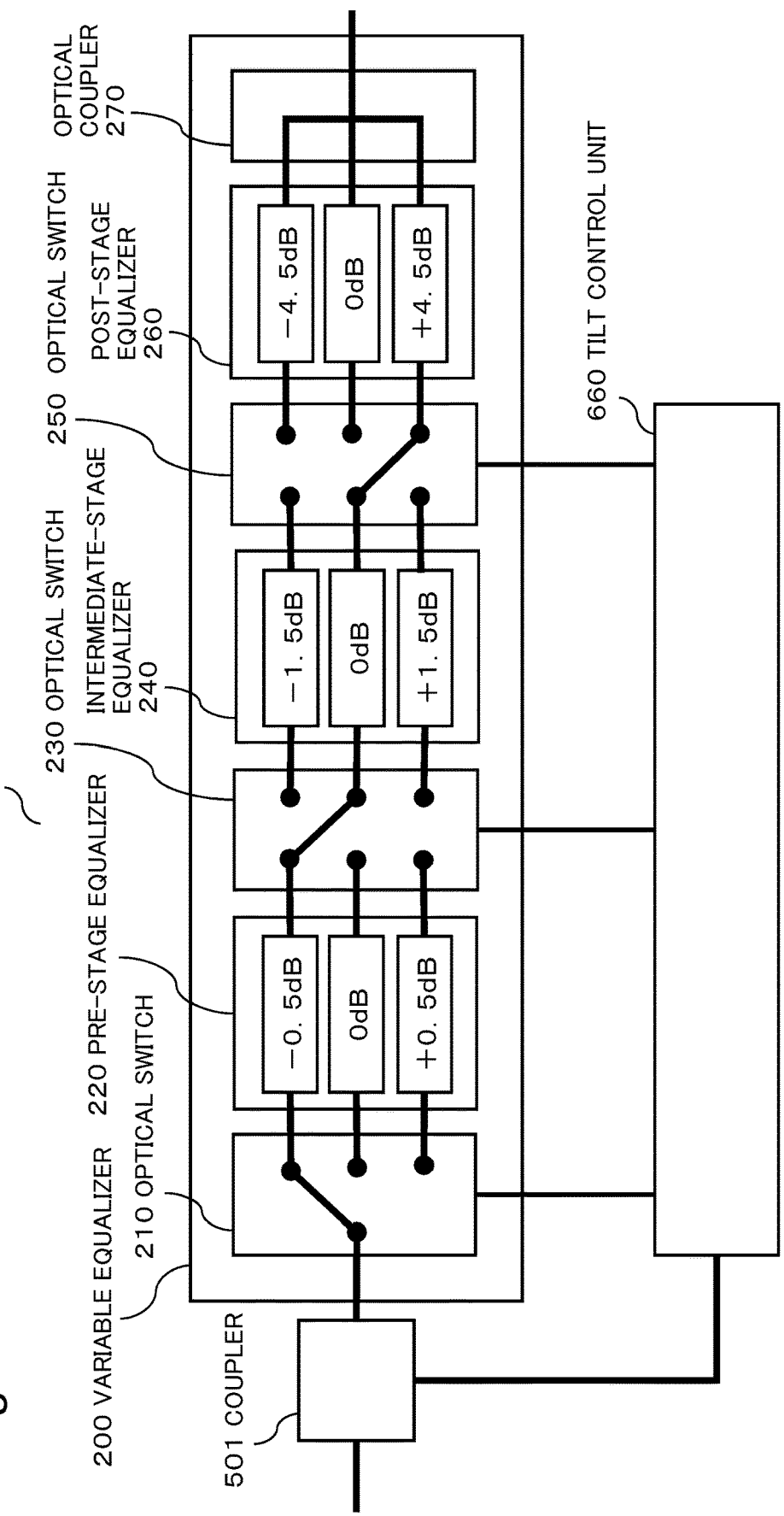
FIG. 5 is a diagram illustrating a configuration example of a variable equalizer system 600 according to a third example embodiment.

FIG. 5 is a diagram illustrating a configuration example of a variable equalizer system 600 according to a third example embodiment of the present invention. The variable equalizer system 600 includes a variable equalizer 200, a coupler 501, and a tilt control unit 660. The variable equalizer 200 includes a pre-stage equalizer 220, an intermediate-stage equalizer 240, and a post-stage equalizer 260, and includes one optical switch 210, two optical matrix switches (optical switches 230 and 250), and an optical coupler 270. The coupler 501 is a 1×2 optical coupler similar to that in the second example embodiment. A configuration and a function of the tilt control unit 660 are basically similar to those of the tilt control unit 560 in the second example embodiment except for taking, as a controlling target, the increased number of optical switches. In other words, the tilt control unit 660 is a circuit including the coupler 502, the bandpass filters 511 to 513, the photodetectors 521 to 523, the analysis unit 530, the switch control unit 540, and the storage unit 550 described above in the second example embodiment. The tilt control unit 660 may include the coupler 501. Hereinafter, description overlapping with the second example embodiment is omitted.

Also in the variable equalizer system 600, a tilt level of the variable equalizer 200 is set based on a tilt level of an input WDM signal. Also in the present example embodiment, a WDM signal input to the variable equalizer 200 is a WDM signal including carriers of seven wavelengths λ1 to λ7 in ascending order of a wavelength.

The variable equalizer 200 differs from the variable equalizer 100 according to the first and second example embodiments in including the intermediate-stage equalizer 240 and the optical switches 230 and 250 provided before and after the intermediate-stage equalizer 240. The optical switch 210, the pre-stage equalizer 220, the post-stage equalizer 260, and the optical coupler 270 have functions relevant to the optical switch 110, the pre-stage equalizer 120, the post-stage equalizer 140, and the optical coupler 150 in the variable equalizer 100. The pre-stage equalizer 220 includes tilt equalizers of −0.5 dB, 0 dB, and +0.5 dB. The intermediate-stage equalizer 240 includes tilt equalizers of −1.5 dB, 0 dB, and +1.5 dB. The post-stage equalizer 260 includes tilt equalizers of −4.5 dB, 0 dB, and +4.5 dB.

Similarly to the tilt control unit 560 according to the second example embodiment, the tilt control unit 660 compares an analysis result A of a tilt level of a WDM signal input to the variable equalizer system 600 with a target tilt level B, and calculates a tilt level adjustment amount C.

FIG. 6 and FIG. 7 are diagrams illustrating tilt amounts that can be set in the variable equalizer 200 in the present example embodiment. FIG. 6 illustrates that a combination of the pre-stage equalizer 220 and the intermediate-stage equalizer 240 can set, in the variable equalizer 200, a tilt amount in a range from −2 dB to +2 dB in a step of 0.5 dB. FIG. 7 illustrates that further combining the post-stage equalizer 260 can set, in the variable equalizer 200, a tilt amount at twenty-seven stages in a range from −6.5 dB to +6.5 dB in a step of 0.5 dB. In a general variable equalizer in which tilt equalizers associated with tilt amounts are individually prepared and are switched, a 1×27 optical switch and a 27×1 optical coupler are necessary in addition to twenty-seven tilt equalizers. However, the variable equalizer 200 can be configured by the nine tilt equalizers, the three optical switches, and the one optical coupler, and thus can greatly reduce the number of used optical devices as compared to the general variable equalizer.

Thus, the variable equalizer 200 according to the present example embodiment achieves the advantageous effect similar to that of the variable equalizer 100 according to the first example embodiment. The variable equalizer system 600 according to the present example embodiment achieves an advantageous effect that a tilt level of an input WDM signal can be adjusted, similarly to the variable equalizer system 500 according to the second example embodiment.

Also in the present example embodiment, the parallel number of tilt equalizers and tilt amounts are not limited to those of the example in the present example embodiment. The variable equalizer 200 may additionally include an optical matrix switch and parallel-connection tilt equalizers in addition to the pre-stage, intermediate-stage, and post-stage equalizers.

The functions and procedures described in the second and third example embodiments may be implemented by causing a central processing unit (CPU) included in the tilt control units 560 and 660 to execute a program. The program is recorded in a tangible and non-transitory recording medium. As the recording medium, a semiconductor memory or a fixed magnetic disk device is used, but the recording medium is not limited to these. The CPU is, for example, a computer included in the tilt control units 560 and 660.

The whole or part of the example embodiments disclosed above can be described as, but not limited to, the following supplementary notes.

(Supplementary Note 1)

A variable equalizer including:
  a first optical equalizer group including a plurality of first optical equalizers whose tilt amounts are different from each other;
  a second optical equalizer group including a plurality of second optical equalizers; and
  an optical element forming an optical path of an optical signal in such a way that the input optical signal passes through a selected first optical equalizer and a selected second optical equalizer, and is output, wherein
at least one of a plurality of the second optical equalizers has a tilt amount different from a tilt amount of any of a plurality of the first optical equalizers.

(Supplementary Note 2)

The variable equalizer according to supplementary note 1, further including:
a first optical switch;
the first optical equalizer including one end connected to an optical path that can be selected by the first optical switch;
a second optical switch connecting another end of the first optical equalizer with one end of the second optical equalizer; and
a first optical coupler connecting another end of the second optical equalizer.

(Supplementary Note 3)

The variable equalizer according to supplementary note 2, wherein
the first optical switch is a 1×N optical switch,
the first optical equalizer group includes N of the first optical equalizers,
the second optical switch is an N×M optical matrix switch,
the second optical equalizer group includes M of the second optical equalizers,
the first optical coupler is an M×1 optical coupler, and
M and N are each an integer equal to or larger than two.

(Supplementary Note 4)

The variable equalizer according to supplementary note 2 or 3, further including:
a third optical equalizer group including a plurality of third optical equalizers; and
a third optical switch connecting another end of the second optical equalizer with one end of the third optical equalizer, wherein
at least one of a plurality of the third optical equalizers has a tilt amount different from a tilt amount of any of a plurality of the first optical equalizers and a plurality of the second optical equalizers, and
the variable equalizer further includes, instead of the first optical coupler, a second optical coupler connecting another end of the third optical equalizer.

(Supplementary Note 5)

The variable equalizer according to supplementary note 4, wherein
the third optical switch is an M×L optical matrix switch,
the third optical equalizer group includes L of the third optical equalizers,
the second optical coupler is an L×1 optical coupler, and
L is an integer equal to or larger than two.

(Supplementary Note 6)

The variable equalizer according to any one of supplementary notes 2 to 5, further including
a tilt control means for controlling the first optical switch and the second optical switch, based on a tilt level of the optical signal input to the first optical switch.

(Supplementary Note 7)

The variable equalizer according to supplementary note 4 or 5, further including
a tilt control means for controlling the first to the third optical switches, based on a tilt level of the optical signal input to the first optical switch.

(Supplementary Note 8)

The variable equalizer according to supplementary note 6 or 7, wherein
the tilt control means includes:
a third optical coupler splitting the optical signal;
a photoelectric conversion unit generating an electric signal that indicates intensities, at a plurality of wavelengths, of the optical signal being split by the third optical coupler;
an analysis means for analyzing a tilt level of the optical signal, based on the electric signal; and
a switch control means for controlling at least the first optical switch and the second optical switch, based on a target tilt level and a tilt level of the optical signal.

(Supplementary Note 9)

The variable equalizer according to supplementary note 7, wherein
the tilt control means includes:
a third optical coupler splitting the optical signal;
a photoelectric conversion unit generating an electric signal that indicates a spectrum of the optical signal being split by the third optical coupler;
a tilt level analysis means for analyzing a tilt level of the optical signal, based on the electric signal; and
a switch control means for controlling at least the first optical switch and the second and third optical switches, based on a target tilt level and a tilt level of the optical signal.

(Supplementary Note 10)

A method of controlling a variable equalizer, including:
selecting a first optical equalizer from a first optical equalizer group including a plurality of first optical equalizers whose tilt amounts are different from each other;
selecting a second optical equalizer from a second optical equalizer group including a plurality of second optical equalizers in which at least one of a plurality of the second optical equalizers has a tilt amount different from a tilt amount of any of a plurality of the first optical equalizers; and
forming an optical path of an optical signal in such a way that the input optical signal passes through the first optical equalizer and the second optical equalizer, and is output.

(Supplementary Note 11)

The method of controlling the variable equalizer according to supplementary note 10, further including:
generating an electric signal that indicates intensities, at a plurality of wavelengths, of the optical signal; and
analyzing a tilt level of the optical signal, based on the electric signal, and wherein
the optical path is formed based on a target tilt level and a tilt level of the optical signal.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims. In addition, the configurations described in the respective example embodiments are not necessarily mutually exclusive. The function and advantageous effect of the present invention may be achieved by a combination of all or a part of the above-described example embodiments.

REFERENCE SIGNS LIST 100, 200, 900 Variable equalizer
110, 130, 210, 230, 250 Optical switch 120, 220 Pre-stage equalizer
240 Intermediate-stage equalizer
140, 260 Post-stage equalizer
121 to 123, 141 to 143 Tilt equalizer
150, 270 Optical coupler
500, 600 Variable equalizer system
501, 502 Coupler
511 to 513 Bandpass filter
521 to 523 Photodetector
530 Analysis unit
540 Switch control unit
550 Storage unit
560, 660 Tilt control unit

The invention claimed is:

1. A variable equalizer comprising:
a first optical equalizer group including a plurality of first optical equalizers whose tilt amounts are different from each other;
a second optical equalizer group including a plurality of second optical equalizers;
a third optical equalizer group including a plurality of third optical equalizers;
a first optical switch, a second optical switch, a third optical switch; and
a first optical coupler; wherein
an optical path that can be selected by the first optical switch is connected to one end of the first optical equalizer,
the second optical switch connects another end of the first optical equalizer with one end of the second optical equalizer,
the third optical switch connects another end of the second optical equalizer with one end of the third optical equalizer,
the first optical coupler connects another end of the third optical equalizer,
at least one of a plurality of the second optical equalizers has a tilt amount different from a tilt amount of any of a plurality of the first optical equalizers, and
at least one of a plurality of the third optical equalizers has a tilt amount different from a tilt amount of any of a plurality of the first optical equalizers and the second optical equalizers.

2. The variable equalizer according to claim 1, wherein
the first optical switch is a 1×N optical switch,
the first optical equalizer group includes N of the first optical equalizers,
the second optical switch is an N×M optical matrix switch,
the second optical equalizer group includes M of the second optical equalizers,
the third optical switch is an M×L optical matrix switch,
the third optical equalizer group includes L of the third optical equalizers,
the first optical coupler is an L×1 optical coupler, and
each of L, M and N is an integer equal to or larger than two.

3. The variable equalizer according to claim 1, further comprising
a tilt controller configured to control the first to the third optical switches, based on a tilt level of the optical signal input to the first optical switch.

4. The variable equalizer according to claim 3, wherein the tilt controller includes:
a second optical coupler splitting the optical signal;
a photoelectric converter configured to generate an electric signal that indicates a spectrum of the optical signal being split by the second optical coupler;
a tilt level analyzer configured to analyze a tilt level of the optical signal, based on the electric signal; and
a switch controller configured to control at least one of the first optical switch and the second optical switch and the third optical switch, based on a target tilt level and a tilt level of the optical signal.

5. A method of controlling a variable equalizer, comprising:
selecting a first optical equalizer from a first optical equalizer group including a plurality of first optical equalizers whose tilt amounts are different from each other;
selecting a second optical equalizer from a second optical equalizer group including a plurality of second optical equalizers in which at least one of a plurality of the second optical equalizers has a tilt amount different from a tilt amount of any of a plurality of the first optical equalizers;
selecting a third optical equalizer from a third optical equalizer group including a plurality of third optical equalizers in which at least one of a plurality of the third optical equalizers has a tilt amount different from a tilt amount of any of a plurality of the first optical equalizers and a plurality of the second optical equalizers; and
forming an optical path of an optical signal in such a way that the input optical signal passes through the first optical equalizer, the second optical equalizer and the third optical equalizer, and is output.

6. The method of controlling the variable equalizer according to claim 5, further comprising:
generating an electric signal that indicates intensities, at a plurality of wavelengths, of the optical signal; and
analyzing a tilt level of the optical signal, based on the electric signal, and wherein
the optical path is formed based on a target tilt level and a tilt level of the optical signal.

* * * * *